(12) United States Patent
Li et al.

(10) Patent No.: US 11,923,133 B2
(45) Date of Patent: Mar. 5, 2024

(54) ADDITIVE MANUFACTURING OF ND-FE-B MAGNETS WITH INSULATING LAYERS

(71) Applicant: FORD GLOBAL TECHNOLOGIES, LLC, Dearborn, MI (US)

(72) Inventors: Wanfeng Li, Novi, MI (US); Franco Leonardi, Dearborn Heights, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/537,917

(22) Filed: Nov. 30, 2021

(65) Prior Publication Data

US 2023/0170120 A1    Jun. 1, 2023

(51) Int. Cl.
| | | |
|---|---|---|
| *H01F 7/02* | (2006.01) | |
| *H01F 1/057* | (2006.01) | |
| *H01F 41/02* | (2006.01) | |
| *B33Y 10/00* | (2015.01) | |
| *B33Y 40/20* | (2020.01) | |
| *B22F 10/28* | (2021.01) | |
| *B22F 10/60* | (2021.01) | |
| *B33Y 80/00* | (2015.01) | |

(52) U.S. Cl.
CPC ............... *H01F 7/02* (2013.01); *B22F 10/28* (2021.01); *B22F 10/60* (2021.01); *B33Y 10/00* (2014.12); *B33Y 40/20* (2020.01); *B33Y 80/00* (2014.12); *H01F 1/057* (2013.01); *H01F 41/0253* (2013.01); *B22F 2301/45* (2013.01)

(58) Field of Classification Search
CPC ........ H01F 7/02; H01F 1/057; H01F 41/0253; B22F 10/28; B22F 10/60; B22F 2301/45; B33Y 10/00; B33Y 40/20; B33Y 80/00
See application file for complete search history.

(56) References Cited

U.S. PATENT DOCUMENTS

| | | |
|---|---|---|
| 7,223,438 B2 | 5/2007 | Mirkin et al. |
| 10,254,499 B1 * | 4/2019 | Cohen .................... H01R 4/024 |
| 2011/0143542 A1 * | 6/2011 | Feurprier .......... H01L 21/67248 438/700 |
| 2017/0154713 A1 * | 6/2017 | Simon ....................... H01F 1/22 |
| 2020/0094321 A1 | 3/2020 | Li et al. |

FOREIGN PATENT DOCUMENTS

| | | |
|---|---|---|
| CN | 104332263 B | 9/2016 |
| CN | 106796835 B | 5/2017 |
| CN | 107527705 A | 12/2017 |
| JP | 2018139305 A | 9/2018 |

OTHER PUBLICATIONS

Goll et al. ("Additive manufacturing of soft magnetic materials and components." Additive Manufacturing 27 (2019): 428-439.) (Year: 2019).*

* cited by examiner

*Primary Examiner* — Ricardo D Morales
(74) *Attorney, Agent, or Firm* — David B Kelley; Brooks Kushman P.C.

(57) ABSTRACT

Permanent magnets and method of making the same are provided. The magnets include a magnetic layer having an insulation layer disposed thereon. The insulation layer is formed via additive manufacturing techniques such as laser melting such that that it has discrete phases including a magnetic phase and an insulating phase.

20 Claims, 3 Drawing Sheets

US 11,923,133 B2

ADDITIVE MANUFACTURING OF ND-FE-B MAGNETS WITH INSULATING LAYERS

TECHNICAL FIELD

The present disclosure relates to permanent magnets and method of making the same via additive manufacturing techniques.

BACKGROUND

Magnets pervade many technologies of modern life. Permanent magnets such as Nd—Fe—B magnets are widely used in electric machines and may be used in modern vehicles including electric vehicles and hybrid electric vehicles. For example, electric machines may include motors such as traction motors.

SUMMARY

A permanent magnet is disclosed. The magnet includes a substrate having a magnetic layer disposed on the substrate, and a patterned insulation layer disposed on the magnetic layer opposite the substrate. The insulation layer may include magnetic segments and insulating portions disposed between the magnetic segments.

A method of making a permanent magnet is disclosed. The method includes providing a substrate, disposing a magnetic layer on the substrate, and disposing one or more magnetic segments on the magnetic layer such that there are one or more gaps defined therebetween. The one or more magnetic segments may be additively manufactured, layer by layer, such as through laser melting techniques. An insulation material may be disposed within the one or more gaps to form an insulation layer having a pattern of discrete phases including a magnetic phase and an insulating phase.

Another permanent magnet is disclosed. The permanent magnet includes a magnetic layer having an insulation layer disposed on the magnetic layer and a capping layer disposed on the insulation layer opposite the magnetic layer. The insulation layer may include a first pattern having a magnetic portion and an insulating portion. The capping layer may include a second pattern of discrete phases and the second pattern may be different than the first pattern.

DETAILED DESCRIPTION

Figure 1:
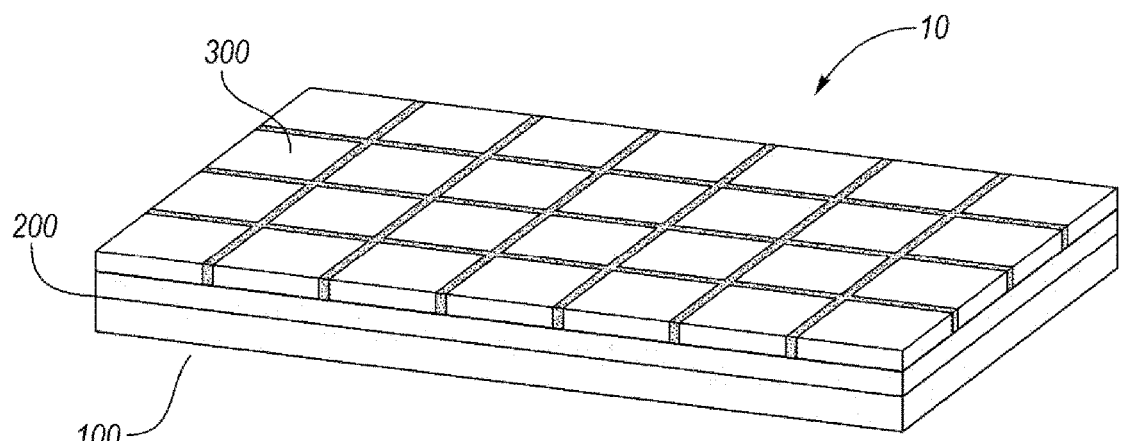
FIG. 1 is a perspective view of a permanent magnet having an insulation layer.

Embodiments of the present disclosure are described herein. It is to be understood, however, that the disclosed embodiments are merely examples and other embodiments can take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Unless expressly stated to the contrary, percent, "parts of," and ratio values are by weight. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "generally" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

FIG. 1 shows a permanent magnet 10 including a substrate 100, a magnetic layer 200, and an insulation layer 300. The insulation layer 300 is patterned, as shown in FIGS. 2A-D. Additive manufacturing techniques such as laser melting, shown in FIG. 3, may be used to provide a patterned layer. The pattern may include magnetic portions or a magnetic segment 302 and insulating portions or an insulating segment 304. Various patterns can be used such that each magnet may accommodate the specific requirements for its purpose and/or may be optimized for its application. For example, the use of magnetic segments 302 may reduce eddy current losses and the insulating portions or segments 304 may protect the magnetic phase from higher temperatures.

The magnetic layer 200 may be any suitable material that produces a persistent or permanent magnetic field such as rare earth permanent magnets. Neodynium-Iron-Boron (i.e., Nd—Fe—B) permanent magnets or Samarium Cobalt (i.e., SmCo) may, for example, be used. Rare earth permanent magnets generally provide superior performance but may be brittle, vulnerable to corrosion, and/or suffer from low thermal stability. The magnetic layer 200 may be additively manufactured and of various shapes and sizes corresponding to its purpose.

Figure 2A:
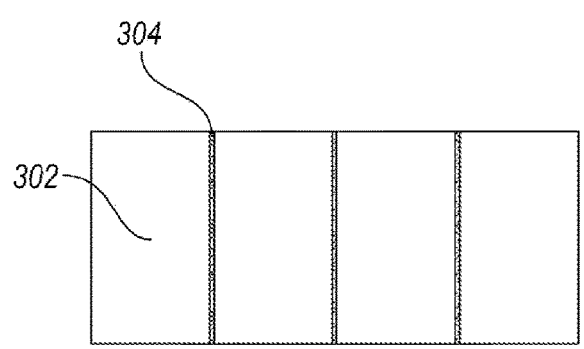
FIGS. 2A-2D are top views of various exemplary patterns that may be used.
Figure 2B:
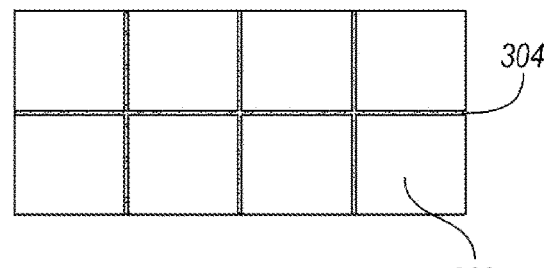
Figure 2C:
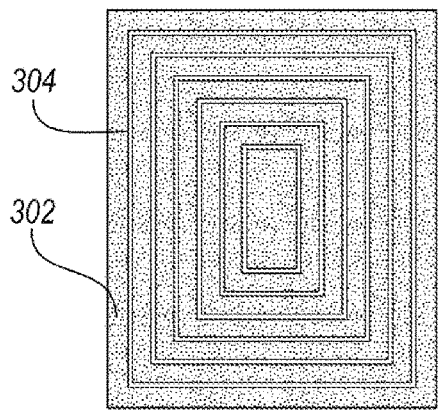
Figure 2D:
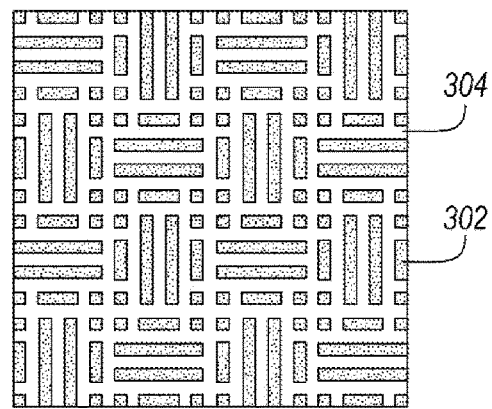
Figure 4A:
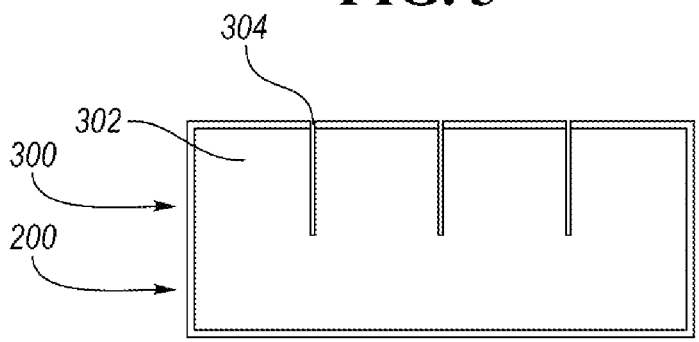
FIGS. 4A-4C are cross-sectional views of permanent magnets.
Figure 4B:
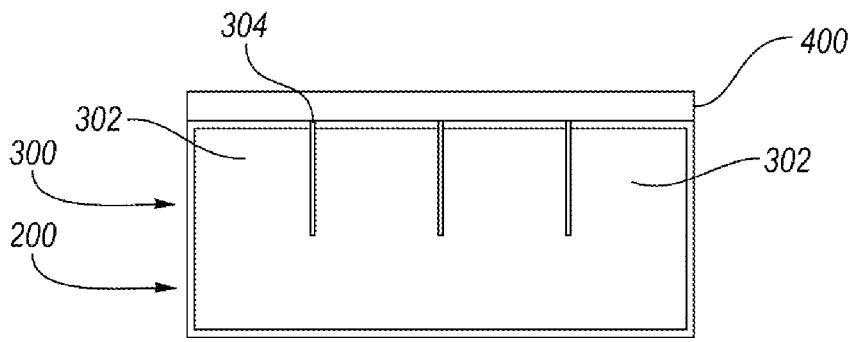
Figure 4C:
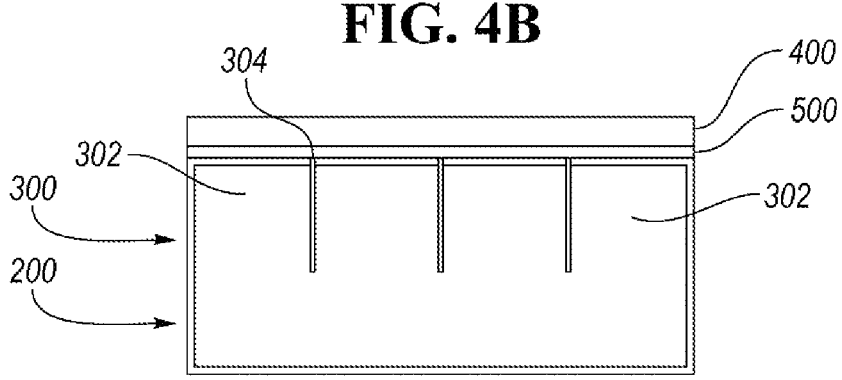

The insulation layer 300 may be disposed on the magnetic layer 200, as shown in FIGS. 4A-C to protect magnetic phase and/or enhance the properties of the magnet 10. The insulation layer 300 may have a plurality of discrete phases such as a magnetic phase and an insulating phase forming a desired pattern. In other words, the insulation layer 300 has different discrete phases within the same layer. Additive manufacturing techniques such as laser melting may be used to provide various different and unique patterns. The patterns may include a magnetic segment 302 and an insulating segment 304. For example, FIG. 2A demonstrates a simple pattern of rectangular magnetic segments with smaller insulating segments disposed therebetween. FIG. 2B, for example, introduces a slightly more intricate pattern including magnetic cells or segments within an insulating matrix or having an insulating matrix therebetween. In yet another example, FIG. 2C, alternating or intermittent rectangular loops of a magnetic phase and insulating phase are used. In still another example, as in FIG. 2D, a much more intricate (e.g., weaved or mosaic) pattern having magnetic segments of various shapes and sizes may be used.

Figure 3:
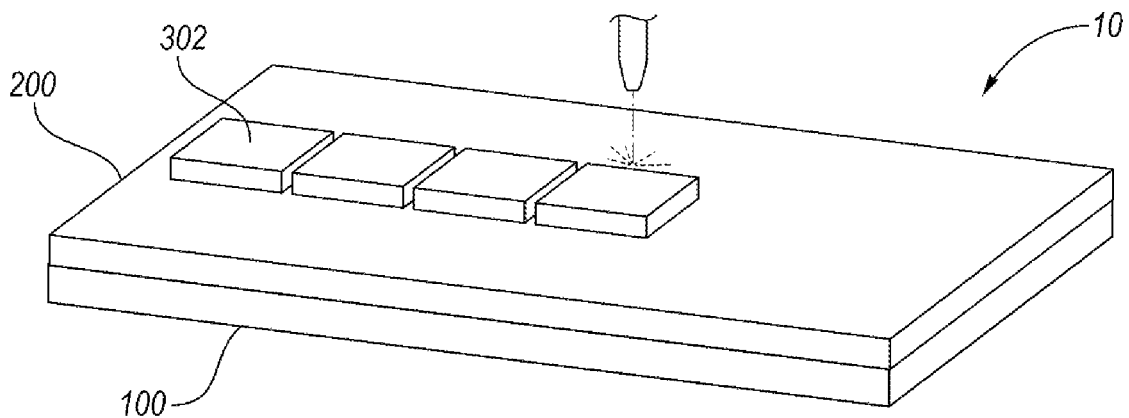
FIG. 3 is perspective view of a permanent magnet having laser melted magnetic segments disposed thereon.

In one variation, each pattern may be uniform or consistent throughout. It should be understood that various patterns may be used, and the patterns are not particularly limited to those disclosed herein. Still further, patterns are not limited to any particular shape or size and may, for example, include various shapes such as but not limited to cubical, rectangular, triangular, polygonal, round, and/or circular. One of the benefits of using additive manufacturing is the flexibility and simplicity of creating magnets of various shapes and sizes. Additive manufacturing mitigates the complexity and waste associated with more conventional forms of producing magnetic segments. For example, techniques such as cutting complex magnetic shapes result in the additional expense and time of waste trimmings. Still further, additive manufacturing provides real-time flexibility that cannot practically be obtained from pressing or stamping techniques. Additive manufacturing techniques form components from stratified layers, or said differently form a component layer by layer. The insulation layer 300 may be formed by additively manufacturing the magnetic segments 302 on the magnetic layer 200 such as by laser melting as shown in FIG. 3.

The aggregate height of the magnetic phase including the magnetic layer 200 and magnetic segments 302 may be 1 to 30 mm, or more preferably 5 to 25 mm, or even more preferably 10 to 20 mm. For example, the magnetic phase may be 3 to 5 mm in one embodiment or 5 to 15 in another embodiment. The insulating material may extend into the magnetic phase at a depth of 0.5 to 500 µm, or more preferably 1 to 100 µm, or even more preferably 5 to 20 µm. In laser melting, a laser 12 is used to melt or sinter a powder at specific locations to, for example, form the magnetic segments 302 on the magnetic layer 200. Laser melting may include but is not limited to selective laser melting (SLM), direct metal laser melting (DMLM), powder bed fusion (PBF) and/or laser powder bed fusion (LPBF). For example, a layer of powder may be provided at a predetermined thickness and a laser may then melt or sinter the powder to form a specific shape. An additional powder layer may be applied on top of the specific shape. This new powder layer can then be melted or sintered to the specific shape to build an additional layer of the specific shape. This process may be repeated until the desired shape is achieved.

In at least one variation, the magnetic segments may be formed via additive manufacturing and then an insulating segments 304 may be formed by disposing the insulating material in the gaps 306 between and/or in the magnetic segments 302. For example, the insulating material may be added in a flowable powder state and then melted/sintered to form insulating portions or may be melted to form a flowable liquid that is then used to fill the gaps 306. After each or any step the magnet 10 may be heat treated to strengthen and/or enhance mechanical properties. The magnetic portions or segments 302 may be the same or different than the magnetic layer 200. The insulating layer 300 may have an electrical conductivity that is less than the magnetic phase and/or a resistivity that is greater than the magnetic phase 200. The insulating phase 300 may have an electrical conductivity of less than $10^6$ S/m, or more preferably less than $5 \times 10^5$ S/m, or even more preferably less than $10^5$ S/m. The insulating phase may have a resistivity of greater than $1.5 \times 10^{-6}$ Ω·m, or more preferably greater than $1.5 \times 10^{-5}$ Ω·m, or even more preferably $1 \times 10^{-4}$ Ω·m. The insulating material may be non-magnetic such as but not limited to Cu—P, Al—Si(Ge), Al—Si(Ge)—Fe(Co,Cr), ceramics, or glasses. The insulating material may also have a lower melting point than the magnetic phase(s). The insulating material may have a melting point of no more than 1000° C., or even more preferably no more than 850° C., or even more preferably not more than 600° C. In a refinement, the insulating portions 304 may be added during contour scanning after the magnetic portions 302 are printed or formed.

The substrate 100 is not particularly limited but may be any compatible material such as a metal, metal alloy, ceramic, plastic sheet, or composite. The substrate 100 may be a component of an electric machine or electric vehicle such as an electric motor.

As shown in FIG. 4B, the permanent magnet 10 may also include a capping layer 400 disposed on the insulation layer 300 opposite the magnetic layer 200. The capping layer 400 may include a highly conductive material such that it mitigates or redistributes the thermal effects of eddy currents. The capping layer 400 may have an electrical conductivity that is greater than the magnetic phase 200 and/or an electrical resistivity that is less than the magnetic phase 200. The conductivity may be at least $10^6$ S/m, or more preferably at least $10^7$ S/m, or even more preferably at least $5 \times 10^7$ S/m. The resistivity may be less than $1.5 \times 10^{-6}$ Ω·m, or more preferably less than $1.5 \times 10^{-7}$ Ω·m, or even more preferably less than $1.5 \times 10^{-8}$ Ω·m. For example, zinc, aluminum, and/or copper may be used as the conductive material. The capping layer 400 may also include a magnetic phase and/or insulating material. In a variation, the capping layer 400 may include alternating strips of a conductive material and a magnetic material. In another variation, the capping layer 400 may include alternating strips of a conductive material, magnetic material, and insulating material. In other words, the capping layer 400 may form a pattern as previously described above. The pattern of the capping layer 400 may be the same or different than the pattern of the insulation layer 300. Like the insulation layer 300, the capping layer may include a plurality of discrete phases within the same layer such that it makes up the desired pattern.

As shown in FIG. 4C, the permanent magnet 10 may also include a thermal barrier layer 500 disposed or sandwiched between the insulation layer 300 and the capping layer 400. The thermal barrier layer may provide an additional degree of thermal protection for the magnetic phase(s). The thermal barrier layer 500 may have a thermal conductivity of no more than 5 W/m·K, or more preferably no more than 2 W/m·K, or even more preferably no more than 1 W/m·K. For example, the thermal barrier layer may include ceramics such as yttria stabilized zirconia.

The non-magnetic phases in the insulation layer 300, capping layer 400, or thermal barrier layer 500 may also provide other desirable properties such a superior mechanical properties (i.e., toughness, hardness, strength) or improved coercivity.

Figure 5:
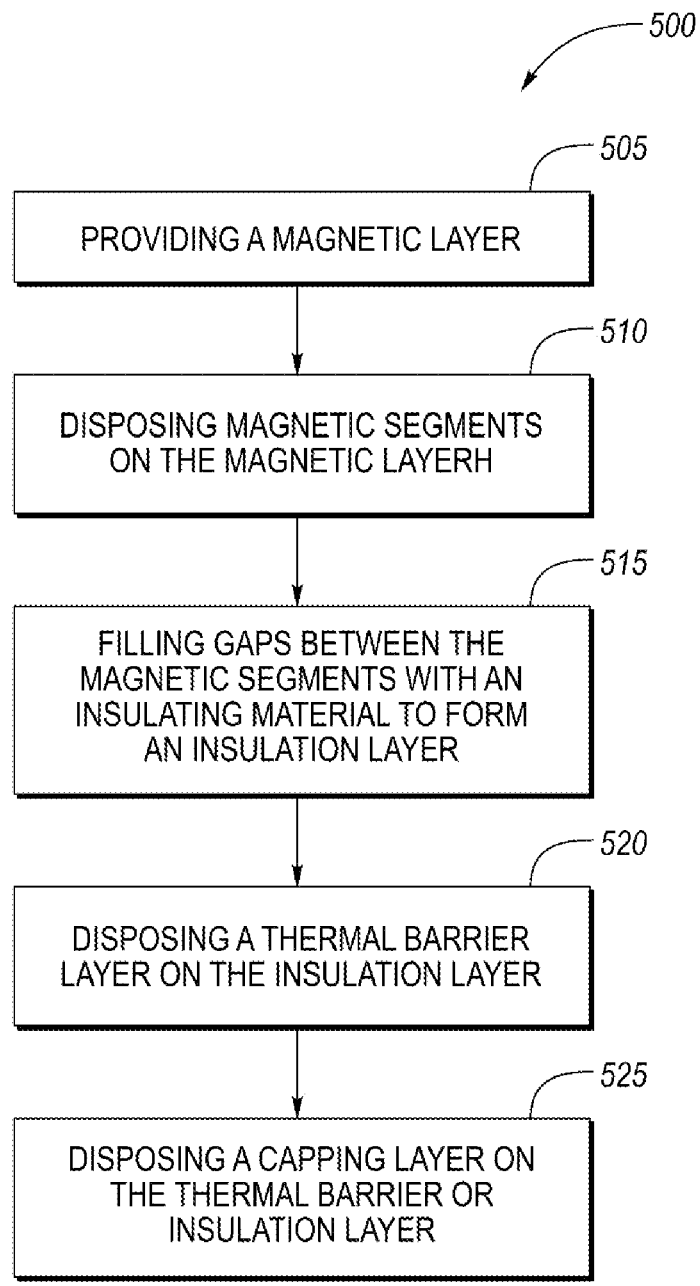
FIG. 5 is a flow chart of a process of making a magnet as disclosed herein.

A method of making the magnets disclosed herein is provided as shown in FIG. 5. The method may include providing a magnetic layer such as Nd—Fe—B (i.e., step 505). The magnetic layer may be provided by disposing a magnetic layer on a substrate such as through various additive manufacturing techniques (e.g., laser melting). For example, a powder layer may be provided on a substrate. The powder layer may be sintered/melted and solidified to form a magnetic layer. The magnetic layer may be stratified or formed by a plurality of layers (i.e., layer by layer) to achieve a desired thickness. However, it should be understood that the magnetic layer does not necessarily need to be additively manufactured but additively manufacturing this layer may be more convenient or add flexibility.

A magnetic portion or portions (i.e., segment or segments) may then be disposed on the magnetic layer in a first pattern (i.e., step 510). Various additive manufacturing or laser melting techniques may be used to provide the shape and design of the first pattern. The first pattern may include one or more gaps, i.e., the magnetic segments may be arranged such that there are gaps disposed therebetween. The gaps may be filled with an insulating material, as described herein, such that the insulating material is inserted, infused, and/or melted and solidified within the one or more gaps (i.e., step 515) to form an insulation layer having the first pattern with a plurality of discrete phases on the magnetic layer. Still further, a multi-material printing method can be used to print magnetic segments and insulating segments simultaneously, intermittently, or sequentially.

A thermal barrier layer may then be disposed on the insulation layer (i.e., step 520). The thermal barrier layer may be disposed on the insulation layer by various means such as but not limited to additive manufacturing techniques or other applications such as arc deposition or spraying.

A capping layer may also be disposed on the insulation layer opposite the magnetic layer (i.e., step 525) such that the thermal barrier layer is an intermediate layer between the insulation layer and capping layer if the thermal barrier layer is included. The capping layer may include a second pattern that is the same or different than the first layer. The capping layer may include a first portion which may be a magnetic phase and a second portion which may be a nonmagnetic phase. Either the first and/or second portion may be additively manufactured such that portions or segments of the capping layer are disposed on the insulation layer or thermal barrier layer and define one or more gaps. The other of the first or second portion may then be disposed within the gaps to form the second pattern. For example, the first portion may be a magnetic phase and may be applied via additive manufacturing techniques such as laser melting. The second portion may be a conductive material that is then at least partially disposed between the laser melted magnetic segments. For example, the conductive material may have an electrical conductivity of at least $10^6$ S/m, or more preferably $5 \times 10^6$ S/m, or even more preferably $10^7$ S/m. In one variation, for example, thin magnetic strips may be disposed on the insulation layer or thermal barrier layer by various laser melting techniques. The gaps between the magnetic strip may then be filled with a conductive material. The conductive material may either be melted prior to filling or may be added as a powder and then melted or sintered before solidifying to form a second pattern of alternating magnetic and conductive portions or strips.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of making a magnet comprising:
    disposing a magnetic layer on a substrate;
    disposing one or more magnetic segments layer by layer on the magnetic layer such that there are one or more gaps;
    disposing an insulation material within the one or more gaps such that the magnetic segments and insulation material form an insulation layer having a first pattern disposed on the magnetic layer; and
    disposing a capping layer to provide conductivity on the insulation layer opposite the magnetic layer, the capping layer having a second pattern that is different than the first pattern and including a magnetic section.

2. The method of claim 1, wherein the magnetic segments are laser melted.

3. The method of claim 2, wherein the insulation material is melted and infused in the one or more gaps.

4. The method of claim 1, wherein the second pattern of the capping layer includes magnetic sections and conductive sections such that at least a portion of the capping layer is laser melted.

5. The method of claim 4, wherein a thermal barrier layer having a thermal conductivity of no more than 5 W/m·K is disposed on the insulation layer prior to disposing the capping layer such that the thermal barrier layer is sandwiched between the insulation layer and the capping layer.

6. The method of claim 4, wherein the magnetic sections are laser melted Nd—Fe—B strips.

7. A method of making a permanent magnet comprising:
    disposing one or more magnetic segments layer by layer on a magnetic layer; and
    disposing an insulation material such that the magnetic segments and insulation material forming an insulation layer having a first pattern disposed on the magnetic layer, the insulation material including at least one selected from the group of Cu—P, Al—Si(Ge), Al—Si(Ge)—Fe(Co,Cr), ceramics, and glasses; and disposing a capping layer on the insulation layer, the capping layer including magnetic sections and conductive sections forming a second pattern that is different than the first pattern, the conductive sections having an electrical conductivity of at least $10^6$ S/m.

8. The method of claim 1, wherein the magnetic layer includes Nd—Fe—B.

9. The method of claim 7, wherein the insulating portions include at least one selected from the group of Cu—P, Al—Si(Ge), Al—Si(Ge)—Fe(Co,Cr).

10. The method of claim 1, wherein the first pattern includes alternating magnetic segments and insulating portions.

11. The method of claim 1, wherein the capping layer includes zinc, aluminum, or copper.

12. The method of claim 1, wherein the capping layer includes a material having a resistivity of less than $1.5 \times 10^{-6}$ Ω·m.

13. The method of claim 1, wherein the capping layer includes discrete magnetic sections and conductive sections.

14. The method of claim 13, wherein the conductive section includes zinc, aluminum, and/or copper.

15. The method of claim 1, further comprising a thermal barrier layer including a ceramic is disposed between the magnetic layer and the capping layer.

16. The method of claim 15, wherein the thermal barrier layer has a thermal conductivity of no more than 5 W/m·K.

17. The method of claim 15, wherein the thermal barrier layer has a thermal conductivity of no more than 1 W/m·K.

18. The method of claim 17, wherein the thermal barrier layer is yttria stabilized zirconia.

19. The method of claim 1, wherein the insulating material extends into the magnetic phase at a depth of 1 to 100 μm.

20. The method of claim 1, wherein the magnetic segments are a permanent magnetic phase.

* * * * *